United States Patent [19]
Madsen et al.

[11] Patent Number: 5,883,927
[45] Date of Patent: Mar. 16, 1999

[54] DIGITAL WIRELESS TELECOMMUNICATION DEVICE FOR REDUCED INTERFERENCE WITH HEARING AIDS

[75] Inventors: James Steven Madsen, San Diego; Richard Kornfeld, Poway, both of Calif.

[73] Assignee: Nextwave Telecom, Inc., San Diego, Calif.

[21] Appl. No.: 690,036

[22] Filed: Jul. 31, 1996

[51] Int. Cl.$^6$ .................................. H04B 1/10; H04L 1/00
[52] U.S. Cl. ........................ 375/296; 375/297; 375/295; 375/346; 330/127; 330/297; 381/94.1; 455/501; 455/63
[58] Field of Search ............................ 375/296, 297, 375/295, 285, 284, 377; 370/252; 455/1, 296, 63, 501, 91, 127, 297; 381/94.1, 68, 124, 79, 94.7, 317, 315; 367/199, 197; 330/297, 127, 199

[56] References Cited

U.S. PATENT DOCUMENTS

| | | | |
|---|---|---|---|
| 4,852,179 | 7/1989 | Fette | 381/29 |
| 5,103,459 | 4/1992 | Gilhousen et al. | 375/1 |
| 5,128,959 | 7/1992 | Bruckert | 375/1 |
| 5,204,846 | 4/1993 | Bruckert et al. | 375/1 |
| 5,247,704 | 9/1993 | Greenwood | 455/73 |
| 5,414,796 | 5/1995 | Jacobs et al. | 395/2.3 |

OTHER PUBLICATIONS

Business Wire, File: b0221132.200, Feb. 22, 1996.
Business Wire, File: b0228094.600, Feb. 28, 1996.
Chorus Universal Listening System User's Manual, Audiological Engineering Corp., Date unknown.

Karr and Naik, "Digital Phones Cause Problems in Hearing Aids", *Wall Street Journal*, Mar. 12, 1996, p. B1.

Reynolds, "Universal Receiver Access to Assistive Listening Systems", *Hearing Journal*, Date unknown.

Zak, "Hearing Aids and EMI (Electromagnetic Interference)", http://www.weiznan.ac.il/deaf–info/hearing–aids–eni.htnl (1995).

Zak, "Impact of New Telecommunication Technologies on the Deaf", Aug. 22, 1993, http://www.weiznann.ac.il/xlachal/impact.htnl.

*Primary Examiner*—Stephen Chin
*Assistant Examiner*—Betsy L. Deppe
*Attorney, Agent, or Firm*—Flehr Hohbach Test Albritton & Herbert LLP; William S. Galliani

[57] ABSTRACT

A digital wireless telecommunication device for reduced interference with hearing aids includes an assistive listening device detector. The assistive listening device detector identifies the presence of different types of assistive listening device signals. In response to such a signal, the assistive listening device detector generates a reduced interference demand signal. Reduced interference digital wireless telecommunication output signals are generated in response to the reduced interference demand signal. The reduced interference digital wireless telecommunication output signals are typically in the form of full rate transmitter output signals. A variety of techniques are disclosed to produce the full rate transmitter output signals. The reduced interference digital wireless telecommunication output signals minimize disruptions to hearing aids in the vicinity of the digital wireless telecommunication device.

26 Claims, 5 Drawing Sheets

DIGITAL WIRELESS TELECOMMUNICATION DEVICE FOR REDUCED INTERFERENCE WITH HEARING AIDS

BRIEF DESCRIPTION OF THE INVENTION

This invention relates generally to reducing interference in hearing aids caused by digital wireless telecommunication devices. More particularly, this invention relates to a technique of reducing such interference in the presence of assistive listening devices.

BACKGROUND OF THE INVENTION

Wireless telecommunication systems utilize analog and digital transmission techniques. The use of digital methods offers several advantages over analog methods, including: increased immunity to channel noise and interference, flexible operation of the system, common format for the transmission of different kinds of message signals, improved security of communication through the use of encryption, and increased capacity. In view of these advantages, digital transmission techniques are growing in popularity.

The growing prevalence of digital wireless telecommunication devices such as telephones, personal digital assistants, personal computers, and other wireless devices is resulting in difficulties for individuals that use hearing aids. When an individual with a hearing aid uses or is close to another individual using a digital wireless telecommunication device, the hearing aid picks up and amplifies the digital signals associated with the device. For example, the hearing aid may pick-up the amplitude modulation inherent in the on-off gated transmitter output signals produced by a wireless telephone using the time division multiple access (TDMA) standard. In a code division multiple access (CDMA) system, transmitter output signals are gated on-off as a function of voice activity. In either system, the gating of the transmitter output signals causes the hearing aid to produce annoying interference in the form of a low frequency buzz accompanied by harmonics and intermodulation. In some hearing aids, the problem cannot even be eliminated by turning down the volume control. Thus, there are ongoing efforts to reduce the impact that digital wireless telecommunication devices have on individuals using hearing aids.

The difficulties that individuals with hearing aids have experienced as a result of the emerging prevalence of digital wireless telecommunication devices is somewhat offset by the development of Assistive Listening Devices (ALDs). ALDs are designed to reduce the ill-effects of noise, distance, and reverberation on hearing. ALDs consist of a transmitter that is used in a large room or building and a group of receivers that are held by individuals. Typically, the receivers can be connected to a hearing aid to improve sound reception.

The Americans with Disabilities Act (ADA) has specified conditions wherein ALDs are to be used. Businesses are currently installing ALDs to comply with the ADA. In addition, many consumers are purchasing personal ALDs for their homes and offices. Also, more and more organizations, such as churches, that are not covered by the ADA, are still responding to the needs of their constituents by installing ALD technology. ALDs are implemented in a number of ways. Presently, frequency modulation, infrared, and audio induction technologies are prevalent.

Since ALDs are commonly installed in locations where there are a relatively large number of individuals wearing hearing aids, the problem of interference caused by digital wireless telecommunication devices is especially problematic in these locations. Consequently, it would be highly desirable to develop a technique, operative in the presence of assistive listening devices, that reduces hearing aid interference caused by digital wireless telecommunication devices.

SUMMARY OF THE INVENTION

A digital wireless telecommunication device for reduced interference with hearing aids includes an assistive listening device detector. The assistive listening device detector identifies the presence of different types of assistive listening device signals. In response to such a signal, the assistive listening device detector generates a reduced interference demand signal. Reduced interference digital wireless telecommunication output signals are generated in response to the reduced interference demand signal. The reduced interference digital wireless telecommunication output signals are typically in the form of full rate transmitter output signals. A variety of techniques are disclosed to produce the full rate transmitter output signals. The reduced interference digital wireless telecommunication output signals minimize disruptions to hearing aids in the vicinity of the digital wireless telecommunication device.

A major benefit of the invention is that it can be readily incorporated into existing digital wireless telecommunication device architectures. Advantageously, the assistive listening device detector can be implemented using standard sensors. Well-known logic circuit elements can be used to generate the reduced interference amplifier control signal of the invention under selective conditions.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1A:
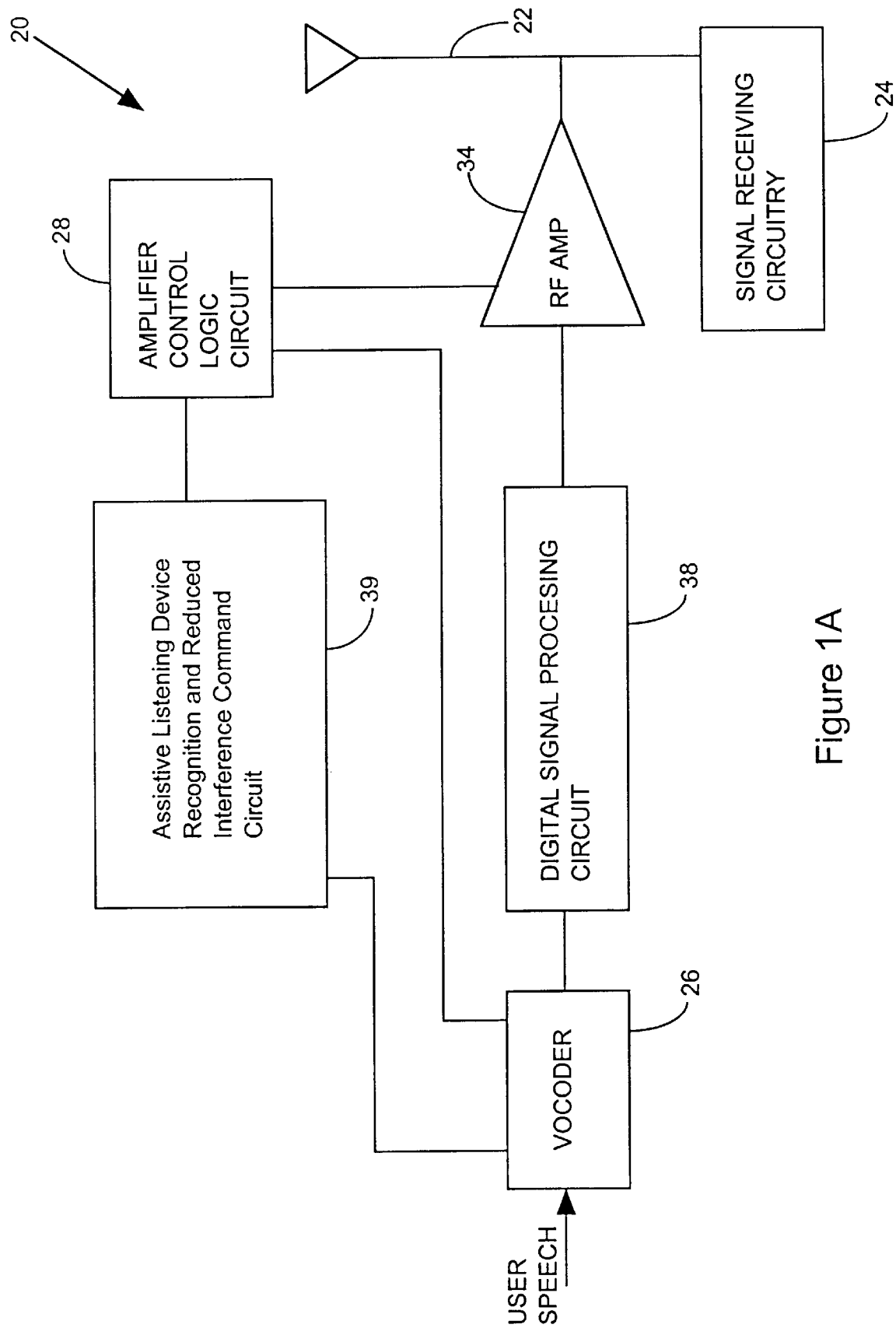
FIG. 1A is a general illustration of a digital wireless telecommunication device for reduced interference with hearing aids in accordance with an embodiment of the invention.

FIG. 1A is a general illustration of a digital wireless telecommunication device 20 in accordance with an embodiment of the invention. The digital wireless telecommunication device 20 is disclosed as a digital wireless telephone by way of example, however, the principles of the invention are also applicable to other wireless devices.

The apparatus 20 includes standard components that are known in the art. These components include an antenna 22, signal receiving circuitry 24, a vocoder 26, an amplifier control logic circuit 28, a radio frequency amplifier 34, and a digital signal processing circuit 38. These known elements are discussed below. The apparatus also includes a novel assistive listening device recognition and reduced interference command circuit 39. This circuit detects the presence of an assistive listening device signal and in response to such a signal, initiates reduced interference digital wireless telecommunication output signals. Typically, the reduced interference digital wireless telephone output signals are in the form of a full rate transmission pattern. This type of signal does not interfere with hearing aids. In the prior art, this type of signal pattern is only generated in response to extremely dense user speech input patterns. However, in accordance with the invention, the vocoder 26 or amplifier control logic circuit 28 is modified to produce this type of output pattern in response to an alternative listening device detection signal. In other words, even though the input speech pattern does not require full rate power amplifier output, such output is generated to reduce interference with hearing aids. The additional data packets required to implement this technique may be duplicate data packets that are ignored at the signal receiving end. Alternate embodiments to generate a full rate transmission pattern are also disclosed.

The invention's use of a full rate transmission pattern to reduce interference with hearing aids is a technique that is not available in a time division multiple access (TDMA) system. A TDMA system will always have the problem of gated AM output signals in the audio band. The use of the techniques of the invention in a code division multiple access (CDMA) system eliminates all gated output signals that will disturb a hearing aid. The techniques of the invention are particularly useful because they are preferably used in connection with ALDs. When used in this context, there are presumably a relatively large number of individuals using hearing aids that will not be disturbed.

Figure 1B:
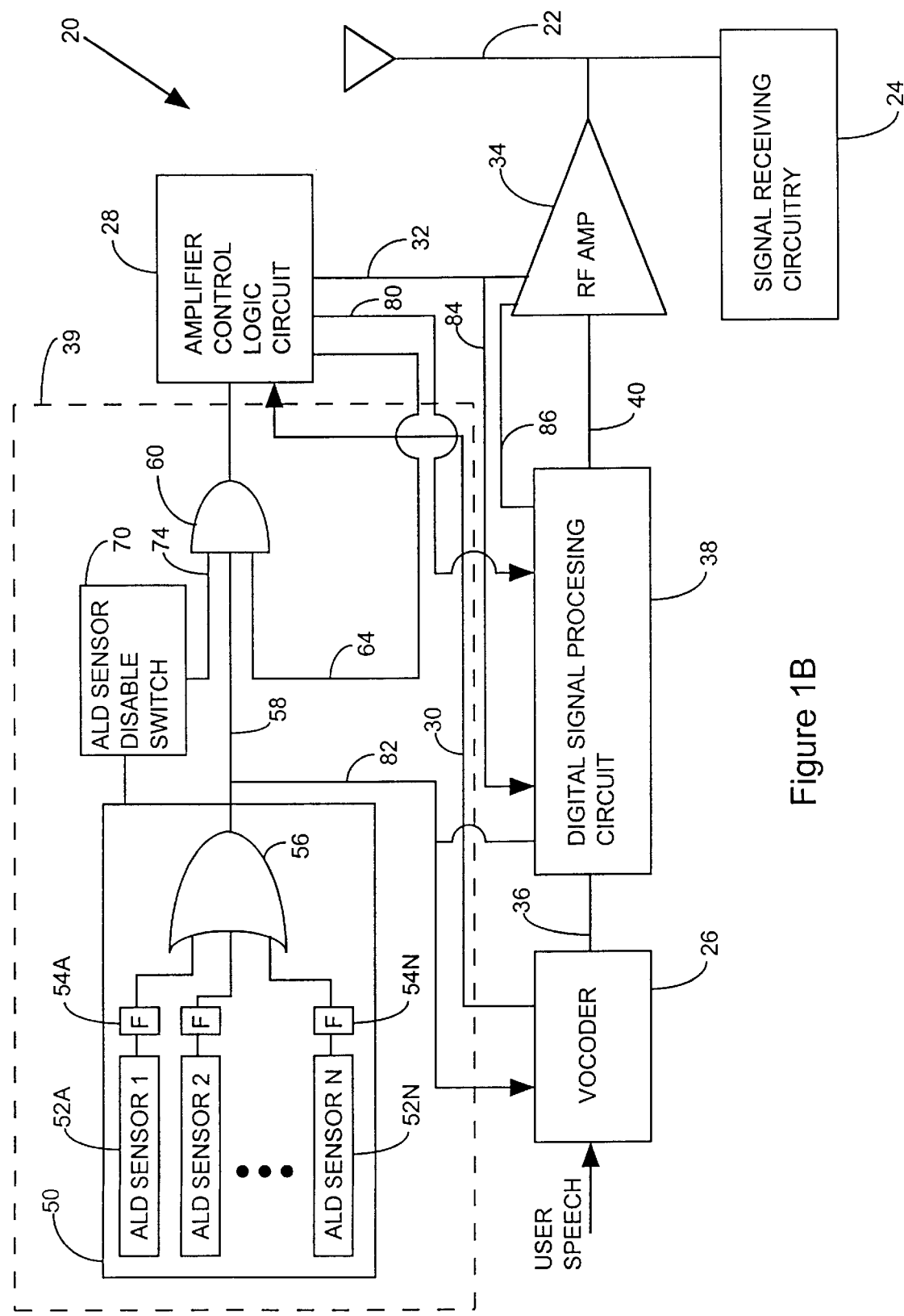
FIG. 1B is a more detailed illustration of a digital wireless telecommunication device for reduced interference with hearing aids in accordance with an embodiment of the invention.

The principle concept of the invention has now been described. Attention presently turns to a discussion of the implementation of an embodiment of the invention, as shown in FIG. 1B. The apparatus 20 includes an antenna 22 that receives incoming digital wireless telecommunication signals that are processed by signal receiving circuitry 24 in accordance with known techniques. The antenna 22 is also used to transmit outgoing digital wireless telecommunication signals. In particular, user speech is applied to a vocoder 26. As known in the art, a vocoder is a device to convert analog speech sounds into corresponding digital signals. U.S. Pat. Nos. 5,414,796 and 4,852,179 disclose vocoders that may be used in accordance with the invention. These patents are expressly incorporated by reference herein.

As known in the art, the vocoder 26 generates a vocoder rate signal that is applied to line 30 and vocoded speech parameter data that is applied to line 36. The vocoder rate signal characterizes the symbol burst transmission pattern that will be required to convey the speech data. A dense input speech pattern will require a relatively high symbol burst transmission pattern, while an intermittent input speech pattern will utilize a relatively low symbol burst transmission pattern. This concept is more fully appreciated with reference to FIG. 2.

Figure 2:
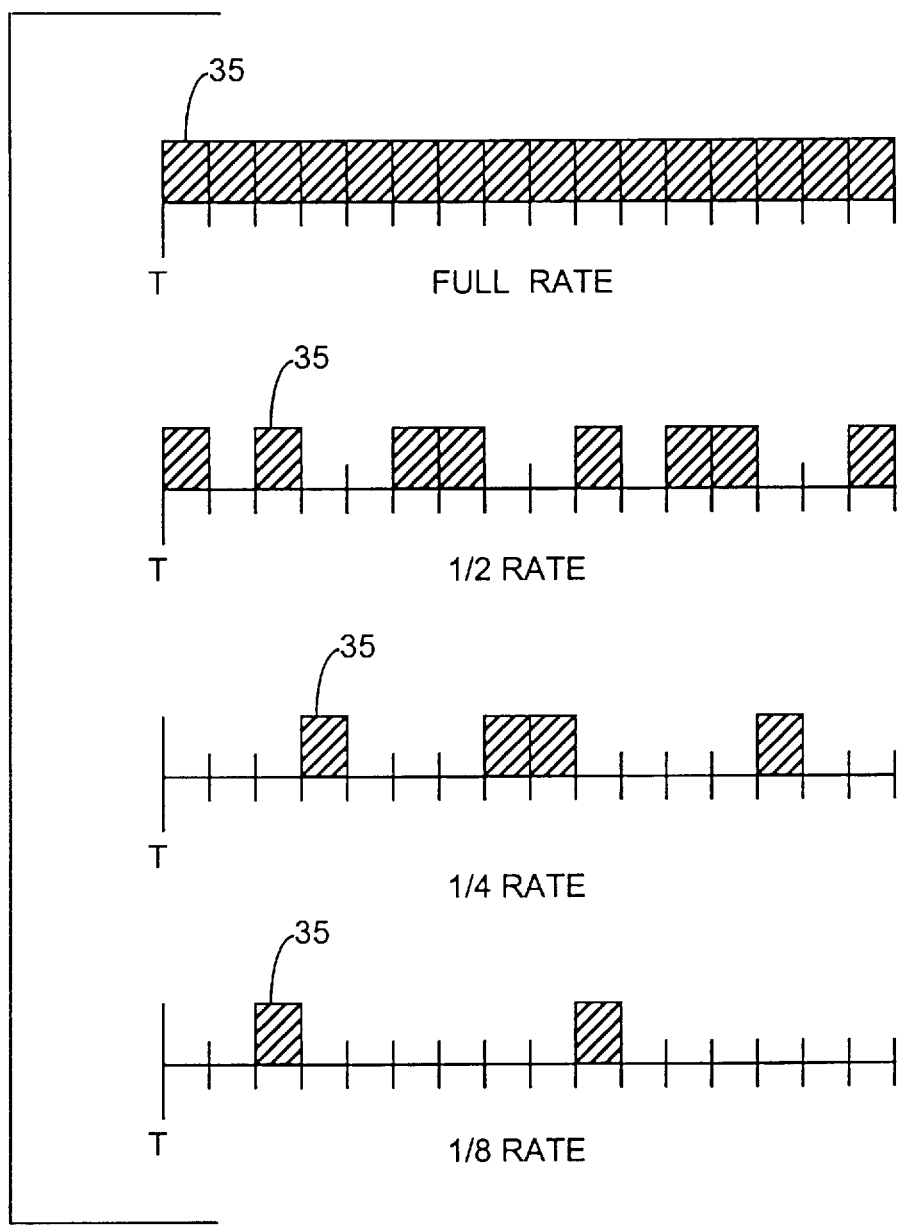
FIG. 2 illustrates various transmitter output signal patterns generated by the apparatus of FIG. 1.

FIG. 2 illustrates a variety of symbol burst transmission patterns. The top of the figure illustrates a full rate symbol burst transmission pattern. In particular, the figure illustrates a vocoder frame with 16 slots, each of which is filled with a data packet 35. The data packet 35 includes code symbols characterizing the input speech. As will be discussed below, the code symbols are generated by the digital signal processing circuit 38.

A constant RF carrier output signal is required for the full rate symbol burst transmission pattern of FIG. 2. When a constant RF carrier output signal is generated, the digital signal switching that causes interference with hearing aids is eliminated.

If a dense input speech pattern is not received, then a different rate symbol burst transmission pattern is used, such as the ½ rate shown in FIG. 2. The ½ rate symbol burst transmission pattern has eight data packets 35. The figure illustrates that there are time gaps between selected data packets 35. These time gaps result in digital signal switching that causes interference with hearing aids. FIG. 2 also illustrates ¼ rate and ⅛ symbol burst transmission patterns.

As indicated above, the vocoder rate signal applied to the amplifier control logic circuit 28 characterizes the symbol burst transmission pattern that will be required to convey the speech data. The amplifier control logic circuit 28 generates a rate control signal that is applied to the RF amplifier 34 over line 32. The rate control signal forces the RF amplifier 34 to generate an output signal with a duty cycle that varies as a function of the vocoder rate signal. Thus, the digital wireless telecommunication output signals launched from the antenna 22 of the digital wireless telecommunication device 20 vary as a function of the vocoder rate signal.

As indicated above, the vocoder 26 generates vocoded speech parameter data that is applied to the digital signal processing circuit 38. The digital signal processing circuit 38 broadly refers to any circuitry required to generate a spread spectrum signal that is applied to the RF amplifier 34 over line 40. The RF amplifier 34 processes the spread spectrum signal and produces data packets 35 as a function of the rate control signal. The use of a digital signal processing circuit 38 to generate a spread spectrum signal from vocoded speech parameter data is known in the art. Circuits of this type typically include an interleaving circuit, a Walsh encoding circuit, and a spreading block with a pseudo noise generator. U.S. Pat. Nos. 5,103,459; 5,204,876; and 5,128,959 describe digital signal processing circuitry that may be used in accordance with the invention. These patents are expressly incorporated by reference herein.

FIG. 1B also illustrates an assistive listening device (ALD) detector 50. Preferably, the ALD detector 50 includes a set of ALD sensors 52A through 52N. By way of example, ALD sensor 52A may be a Frequency Modulation (FM) ALD signal detector. FM ALD technology relies upon FM transmitters tuned to any of the channels designated by the Federal Communications Commission (FCC) for communications for the hearing impaired (72–76 MHz). Thus, the FM ALD signal detector is a device to scan these frequencies for a signal. If a signal is found at one of these frequencies, an ALD sensor signal is generated.

The ALD detector 50 preferably includes an inductive ALD signal detector. Induction ALD technology relies upon transmitting sound through an audio loop. An audio loop system consists of an electronic control box and a wire "looped" around the physical boundary of interest. The inductive ALD signal detector generates an ALD sensor signal when an audio signal from the audio loop is sensed.

In a preferable embodiment, the ALD detector 50 also includes an infrared signal detector. Infrared ALD technology relies upon transmitting sound via an infrared assistive listening system transmitter. The transmitting frequency is 95 kHz. Infrared systems require a "line of sight" between the transmitter and the receiver. A variety of infrared signal detectors may be used in accordance with the invention. When an ALD infrared signal is identified, an ALD sensor signal is produced.

Preferably, each sensor 52A–52N has a corresponding filter 54A–54N. Each filter is implemented to accommodate the stability characteristics of its sensor. For example, different one-shot timers may be used for the various filters 52A–52N.

Figure 1B also illustrates that the ALD detector 50 includes a logical OR gate 56. The logical OR gate 56 operates to combine the different sensor signals generated by the ALD sensors 52A through 52N. If any sensor signal is activated, the logical OR gate 56 generates an ALD detector output signal. Thus, the ALD detector 50 generates an ALD detector output signal if any ALD sensor 52A–52N identifies the presence of an ALD. The use of a logical OR gate 56 is not critical, nor is the signal polarity of the ALD detector output signal. As will be appreciated by those skilled in the art, other logical circuits may be used in accordance with the invention.

In one embodiment of the invention, the ALD detector output signal is directly applied to the amplifier control logic circuit 28 and thereby constitutes an ALD detection signal. The ALD detection signal and the ALD detector output signal are generally referred to herein as a reduced interference demand signal. In accordance with the invention, a reduced interference demand signal may be generated by other circuits or devices.

The amplifier control logic circuit 28 responds to the ALD detection signal by generating rate control signals that result in a full rate symbol burst transmission pattern, as shown at the top of FIG. 2. The rate control signals in this case are referred to as reduced interference amplifier control signals. The RF amplifier 34 responds to these signals by generating reduced interference digital wireless telecommunication output signals.

The invention can be implemented using symbol burst transmission patterns that are not at full rate. In other words, while the full rate symbol burst transmission pattern provides reduced interference, other transmission patterns do as well. For example, a predetermined vocoder rate signal slightly beneath the full rate may be defined as a reduced interference pattern that does not have to be increased to a full rate pattern. Similarly, a predetermined vocoder rate signal slightly above a non-transmission rate may be defined as a reduced interference pattern that does not have to be transformed into a full rate pattern.

In accordance with the invention, the amplifier control logic circuit 28 is pre-programmed to correlate specific vocoder rate signals with an interference state. For example, the full rate, the predetermined rate slightly beneath the full rate, and the predetermined rate slightly above the non-transmission rate may be characterized by the amplifier control logic circuit as a reduced interference state. Every other rate signal received by the vocoder 26 is associated with an interference state. The interference state is indicated with an interference indication signal on line 64. By way of example, an interference state may be identified with a digital high value, while a non-interference state may be identified with a digital low value.

As shown in FIG. 1B, the interference indication signal may be logically combined at logical AND gate 60 with the ALD detector output signal on line 58. If the non-interference state is indicated with a digital low value, then the presence of the ALD detector output signal as a digital high value on line 58 will generate a digital low value at the output of the logical AND gate 60. In this case, no ALD detection signal is considered to exist, and the amplifier control logic circuit continues to generate the reduced interference amplifier control signals it is presently generating. On the other hand, if the interference indication signal assumes a digital high value corresponding to an interference state, then the output of the logical AND gate 60 is a digital high value. In this case, the amplifier control logic circuit 28 generates reduced interference amplifier control signals in the form of full rate symbol burst transmission instructions. A full rate over-ride signal may be applied to the digital signal processing circuit 38 over line 80. The full rate over-ride signal forces the digital signal processing circuit 38 to repeat data packets for the full rate transmission pattern.

A full rate transmission pattern may also be generated directly at the vocoder 26. That is, signal line 82 may be connected to vocoder 26. In this case, when the ALD detector output signal is activated on line 82, the vocoder 26 automatically generates a full rate vocoder rate signal.

FIG. 1B illustrates that the apparatus of the invention may be constructed with an ALD sensor disable switch 70. The ALD sensor disable switch 70 may be implemented in a number of ways. For example, the switch 70 may be implemented to generate an ALD disable signal that is applied to the ALD detector 50. In this case, the ALD disable signal operates to disable each sensor 52A–52N of the ALD detector 50. Alternately, an ALD disable signal may be applied as a digital low value on line 74. The digital low value thereby prevents the output of the logical AND gate 60 from being a digital high value.

The invention may be implemented by generating a full rate transmission pattern that does not include the transmission of full rate data packets. In other words, the invention may be implemented without changing the vocoder rate signal. In such an embodiment, a random signal is generated between data packets such that a full rate signal is effectively produced. Implementations of this technique are disclosed in reference to FIGS. 3 and 4.

Figure 3:
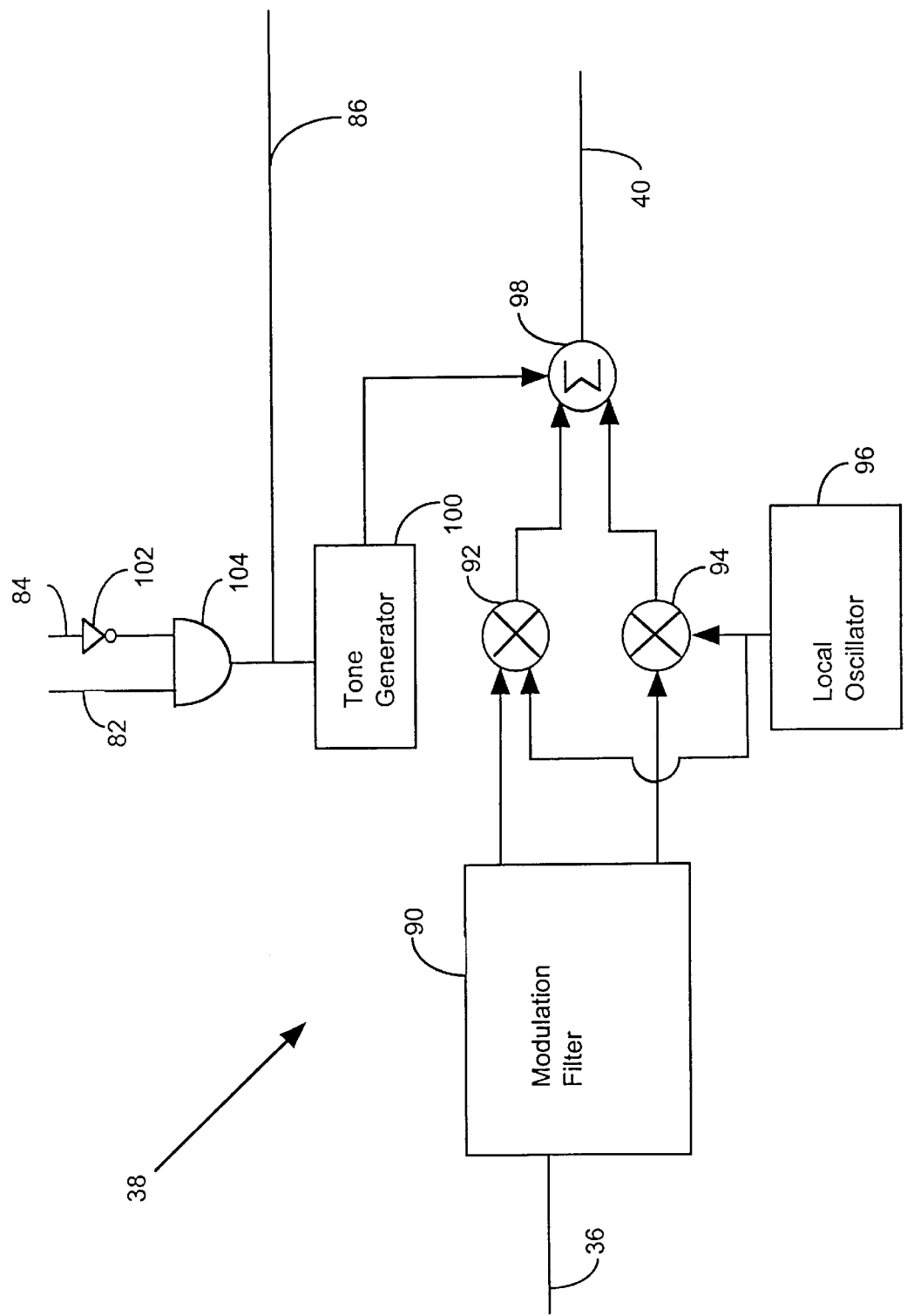
FIG. 3 illustrates a digital signal processing circuit that may be used to generate full rate reduced interference digital wireless telecommunication output signals in accordance with an embodiment of the invention.

FIG. 3 illustrates a digital signal processing circuit 38 in accordance with the invention. As indicated above, digital signal processing circuits 38 for processing vocoded speech parameter data are known in the art. Such circuits typically include a modulation filter 90 to process the vocoded speech parameter data received from line 36. In addition, such circuits typically include a first up-converter 92 to process an in-phase signal and a second up-converter 94 to process a quadrature signal. The up-converters 92 and 94 are connected to a local oscillator 96. The outputs of the up-converters 92 and 94 are combined at a summer 98. The output of the summer 98 is applied to the input node 40 of the RF amplifier 34. Elements 90–98 of FIG. 3 are known in the art.

When the vocoder rate signal is set relatively low, there are time gaps in which data packets are not sent. That is, during these time gaps, no data is driven onto line 40. This results in transmitter output switching that disrupts hearing aids. In accordance with the invention, a full rate transmitter output signal is achieved by applying a tone signal to the input of the RF amplifier 32 when data packets are not being transmitted.

As shown in FIG. 3, this technique may be implemented as follows. A tone generator 100 is used to produce a tone with an amplitude matched to a CDMA signal. The tone is generated when a reduced interference demand signal exist and when a power-off signal to the RF amplifier 34 exists. A power-off signal to the RF amplifier 34 "punctures" or otherwise generates the digital switching that causes interference with hearing aids. When such a signal is generated by the amplifier control logic circuit 28 and is applied to line 32, it is routed to the digital signal processing circuit 38 via line 84. It is then inverted with inverter 102. Thus, when a digital low signal corresponds to a power-off signal, the inverter 102 effectively produces a digital high power-on signal. When line 82 carries a digital high reduced interference demand signal, the output of the logical AND gate 104 is a digital high signal. The digital high signal activates the tone generator 100. In addition, the digital high signal is carried on line 86 to an auxiliary power input node on the RF amplifier 34, as shown in FIG. 1B. The signal on the auxiliary power input node turns the RF amplifier 34 on, even though a power-off signal is received on line 32.

Figure 4:
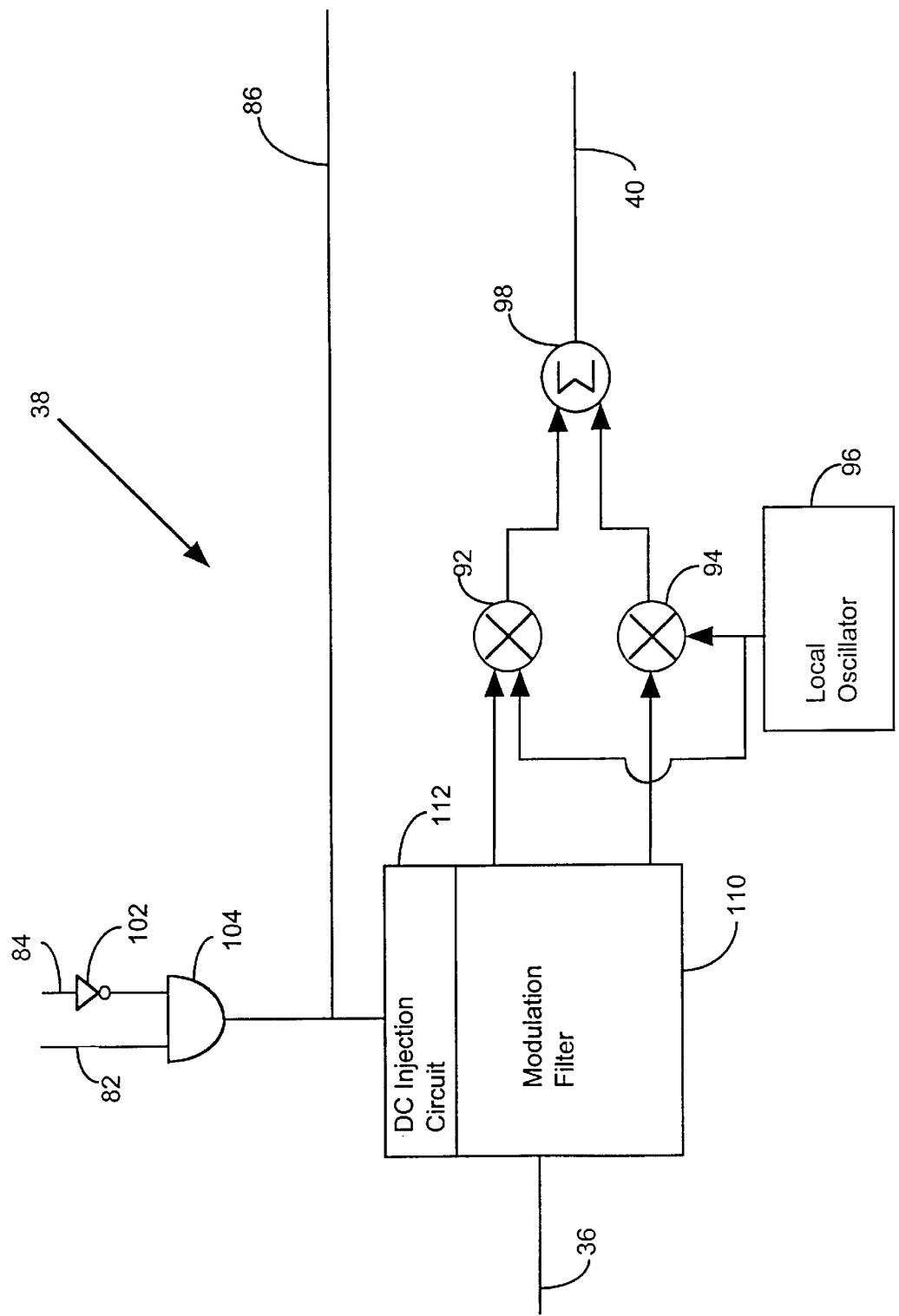
FIG. 4 illustrates a digital signal processing circuit that may be used to generate full rate reduced interference digital wireless telecommunication output signals in accordance with another embodiment of the invention.

FIG. 4 illustrates another technique for generating a full rate signal without relying upon a full rate vocoder rate signal. The elements in FIG. 4 generally correspond to those in FIG. 3. However, in FIG. 4, the modulation filter 110 includes a DC injection circuit 112. The DC injection circuit 112 is activated in the same manner as the tone generator 100 of FIG. 3. When activated, the dc injection circuit 112 injects a dc signal into the up-converters 92 and 94. As a result, the local oscillator signal bleeds through the up-converters 92 and 94 and is fed to the input node 40 of the RF amplifier 34. This occurs as the RF amplifier 34 is turned-on by the digital high signal on line 86.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A digital wireless telecommunication device, comprising:
    an assistive listening device detector to produce a reduced interference demand signal in response to the presence of an assistive listening device signal; and
    means for generating reduced interference digital wireless telecommunication signals in response to said reduced interference demand signal.

2. The apparatus of claim 1 wherein said assistive listening device detector includes an FM assistive listening device signal detector.

3. The apparatus of claim 1 wherein said assistive listening device detector includes an inductive assistive listening device signal detector.

4. The apparatus of claim 1 wherein said assistive listening device detector includes an infrared assistive listening device signal detector.

5. The apparatus of claim 1 wherein said assistive listening device detector includes:
    a first assistive listening device sensor with a first assistive listening device output node selectively propagating a first assistive listening device sensor signal;
    a second assistive listening device sensor with a second assistive listening device output node selectively propagating a second assistive listening device sensor signal; and
    a logic circuit connected to said first assistive listening device output node and said second assistive listening device output node to generate an assistive listening device detector output signal, corresponding to said reduced interference demand signal, in response to said first assistive listening device sensor signal or said second assistive listening device sensor signal.

6. The apparatus of claim 1 further comprising an assistive listening device disable switch to disable said assistive listening device signal.

7. The apparatus of claim 5 further comprising an amplifier control logic circuit to generate an interference indication signal when reduced interference digital wireless telecommunication output signals are not produced.

8. The apparatus of claim 7 further comprising
    a second logic circuit including
        a first input node to receive said assistive listening device detector output signal,
        a second input node to receive said interference indication signal, and
        an output node to convey an assistive listening device detection signal, corresponding to said reduced interference demand signal, to said amplifier control logic circuit when said assistive listening device detection signal and said interference indication signal are asserted.

9. The apparatus of claim 8 further comprising:
    an assistive listening device disable switch to generate an assistive listening device disable signal; and
    wherein said second logic circuit includes a third input node to receive said assistive listening device disable signal, and wherein said output node conveys said assistive listening device detection signal to said amplifier control logic circuit when said listening device detection signal, said assistive listening device detector output signal, and said interference indication signal are asserted.

10. The apparatus of claim 1 wherein said generating means include means for producing full rate reduced interference digital wireless telecommunication signals.

11. The apparatus of claim 10 wherein said producing means include a vocoder producing a full rate vocoder rate signal in response to said reduced interference demand signal.

12. The apparatus of claim 11 wherein said producing means include an amplifier control logic circuit to produce full rate reduced interference amplifier control signals in response to said reduced interference demand signal.

13. The apparatus of claim 10 wherein said producing means includes
    an RF amplifier;
    a tone generator to apply a tone signal at a selected frequency to said RF amplifier during selected time periods; and
    a logic circuit to generate an auxiliary power on signal for said RF amplifier during said selected time periods, wherein said selected time periods correspond to time periods at which a power-off signal is applied to said RF amplifier.

14. The apparatus of claim 10 wherein said producing means include:

an RF amplifier;

a dc injection circuit to produce a dc injection signal during selected time periods at which a power off signal is applied to said RF amplifier;

an in-phase up-converter to receive said dc injection signal;

a quadrature up-converter to receive said dc injection signal; and a local oscillator generating a local oscillator signal, said local oscillator being connected to said in-phase up-converter and said quadrature up-converter, said dc injection signal forcing said local oscillator signal from said in-phase up-converter and said quadrature up-converter to said RF amplifier.

15. A digital wireless telecommunication device, comprising:

an RF amplifier;

an amplifier control logic circuit connected to said RF amplifier, said amplifier control logic circuit generating a rate control signal including power-on command signals and power-off command signals; and means for supplying a full rate output signal to said RF amplifier, said supplying means including means for producing a random input signal to said RF amplifier during said power-off command signals, and means for furnishing an auxiliary power-on command for said RF amplifier during said power-off command signals.

16. The apparatus of claim 15 wherein said supplying means includes a tone generator.

17. The apparatus of claim 15 wherein said supplying means includes a DC injection circuit to supply a dc signal to an up-converter during said power-off command signals.

18. The apparatus of claim 15 wherein said furnishing means includes a logical AND gate with a first input node to receive a reduced interference demand signal, a second input node to receive an inverted rate control signal corresponding to said rate control signal, and an output node carrying said auxiliary power-on command signal.

19. A method of reducing interference in a hearing aid caused by a digital wireless telecommunication device, said method comprising the steps of:

sensing the presence of an assistive listening device signal; and generating, in the presence of an assistive listening device signal, reduced interference digital wireless telecommunication output signals.

20. The method of claim 19 wherein said sensing step includes the step of sensing for an FM assistive listening device signal, an inductive assistive listening device signal, and a infrared assistive listening device signal.

21. The method of claim 19 wherein said generating step includes the steps of:

identifying whether reduced interference digital wireless telecommunication output signals presently exist; and maintaining said reduced interference digital wireless telecommunication output signals in the presence of said assistive listening device signal.

22. The method of claim 19 wherein said generating step includes the step of producing a full rate transmitter output signal in response to said assistive listening device signal to yield said reduced interference digital wireless telecommunication output signals.

23. The method of claim 19 wherein said generating step includes the step of producing a full rate vocoder output signal.

24. The method of claim 22 wherein said producing step includes the steps of forcing a random input signal to an RF amplifier during power-off command signals to said RF amplifier, and furnishing an auxiliary power-on command for said RF amplifier during said power-off commands.

25. The method of claim 24 wherein said random input signal of said forcing step is a tone signal.

26. The method of claim 24 wherein said random input signal of said forcing step is a dc signal applied to an up-converter during said power-off command signals to said RF amplifier.

* * * * *